March 28, 1967 C. D. SKIRVIN 3,311,830

AM AND FM TRANSMITTER

Filed Aug. 26, 1965

CLIFFORD D. SKIRVIN
INVENTOR.

BY White & Haefliger
ATTORNEYS.

United States Patent Office 3,311,830 Patented Mar. 28, 1967

3,311,830

AM AND FM TRANSMITTER

Clifford D. Skirvin, Pomona, Calif., assignor to Microdat Inc., South Pasadena, Calif., a corporation of California Filed Aug. 26, 1965, Ser. No. 486,590
13 Claims. (Cl. 325—105)

This invention is a continuation-in-part of application Ser. No. 214,871 filed in the name of Clifford D. Skirvin on Aug. 6, 1962. The invention relates generally to transmitters, and more particularly relates to low-power broadcast transmitters from which the signal is primarily conducted through the earth crust zone, with line-of-sight atmospheric secondary conduction.

This invention includes and proceeds from a principle of radiowave transmission that is new to the instant invention; for applicant has discovered a method of transmission that constitutes a great improvement over the formerly-used AM transmission methods and FM transmission methods. The new transmission principle according to the invention consists of broadcasting a combined AM and FM signal (hereinafter called an AM/FM signal) or in other words, modulating a radio-frequency (RF) carrier signal *both* in its amplitude (AM) and in its frequency (FM) at the same time and with the same modulating information. The resulting amplitude- and frequency-modulated carrier signal has capabilities that far transcend either AM or FM.

In actual tests, applicant's new AM/FM signal has traveled the same distance as standard AM signals and yet has given FM sensitivity and immunity to noise, all on far less power than was heretofore thought possible. Even more important, however, an AM/FM transmitter according to this invention can be operated with substantially undiminshed effectiveness in environments that were formerly considered "grounded," even as to the most powerful transmitters, and therefore were considered impossible to transmit from. Well known examples of such environments are the insides of tunnels, metal-frame buildings, automobiles, and trains, where transmission is impossible without the use of an outside antenna. Moreover, the immense broadcast distances achieved in trials of transmitters according to the invention indicates that AM/FM transmission actually propagates through the ground, apparently by varying the "floating potential" thereof and imposing the combined AM and FM modulated signals to the earth's electrical-magnetic fields in a manner that permits AM/FM signals to be sensed by very distant receivers.

Generally speaking, the novel transmitter which is the subject of the invention incorporates a radio frequency oscillator circuit including a single transistor oscillator which may either be tuned through a high frequency range, as for example 80 to 210 megacycles, or toned to any frequency desired and crystal controlled to the fixed frequency. As will be explained, an important and novel feature of the transmitter concerns its incorporation of both amplitude and frequency modulation.

Basically, the novel circuit includes a frequency resonant circuit called a tank, coupled to the transistor collector terminal, a feedback connection from the tank to the emitter, an antenna coil inductively coupled to the tank coil, and a microphone coupled to the base to provide frequency modulation of the oscillator and amplitude modulation of the oscillator basic frequency. More particularly, the microphone output is coupled to the transistor base, so that the oscillator frequency is changed at an audio rate by the voltage changes developed at the microphone to cause the basic frequency to change or swing plus or minus through a maximum, as for example 26 kilocycles total excursion. At the same time, the amplitude, i.e., audio frequencies produced by the microphone or present in the environment of the transmitter are impressed upon the basic frequency of the oscillator to provide a signal transmission of extremely accurate fidelity.

In other words, the invention is a new and highly improved radio transmitter especially useful for audio broadcast with hand-held or smaller sets and using low-wattage power supplies. As the figures and detailed description will show explicitly for one embodiment, the transmitter of the invention needs only one transistor, to the emitter of which a tank circuit having inductor and capacitor is coupled to form an oscillator circuit. A voice microphone or other acoustical-to-electrical transducer and the inductor combine to provide both frequency modulation and amplitude modulation of the output signal in the following manner: acoustical signals at the microphone or transducer vary the voltage output thereof and thus vary the operating level of the base of the transistor (or other control electrode of the transistor). Since this variation of the operating point of the transistor causes corresponding variation in the amplitude of the AC output of the transistor oscillator, AM modulation of the oscillator output is accomplished.

An important feature of applicant's invention lies in the method of FM modulation: the emitter or input electrode of the oscillator transistor mentioned above is coupled through the inductor and a coupling capacitor to the positive power supply of the transmitter circuit. Obviously, when the transistor is in its conductive state, variation of the value of the inductor would vary the input impedance of the transistor and the amount of current permitted to pass therethrough into the oscillator tank. Such a variation of the amount of current in the tank would, of course, shift the resonant frequency of the tank, resulting in frequency modulation (FM) in addition to the amplitude modulation (AM) resulting from the microphone.

Another important feature of the instant invention is the construction of the inductor of loose and lightweight wire such that the acoustical signals in the vicinity of the AM and FM transmitter cause the wire to vibrate, thereby varying the instantaneous reactance value of the exposed inductor and frequency-modulating the output of the oscillator tank. Another feature of the invention is the coupling of the antenna of the transmitter to the inductor of the oscillator tank only through a conductive plate placed in the field of the tank inductor and electrically insulated therefrom by a mounting board so that antenna load variations cannot affect the impedance of the tank. Other features of the invention include the use of AM and FM modulation in the same transmitter for extremely high fidelity and the use of a crystal in the oscillator tank circuit or elsewhere to stabilize the frequency of the AM and FM transceiver as shown in FIGURE 2. This added crystal control aids in preventing FM drift or similar fine inaccuracies, and is important to help in complying with FCC control fineness requirements when the AM and FM transmitter is used at higher power levels.

It should be noted that an AM/FM modulated signal produced according to the inventive principles is useful for a number of specific applications in addition to its general transmission advantages as enumerated above. One general area is the superimposition of the AM/FM signal on other signals, either AM or FM, such as combined music and public address systems or radio and television broadcasts. When an AM/FM signal is locally superimposed upon an FM broadcast, for example, the broadcast FM is cancelled out by the FM portion of the AM/FM signal, while the AM from the AM/FM signal proceeds to demodulation. Thus closed circuit programs can be interrupted for announcements by an AM/FM signal, while radio or TV programs can similarly be interrupted by a local warning transmitter or the like.

These and other objects and advantages of the invention, as well as the details of an illustrative embodiment, will be more fully understood from the following detailed description of the drawings in which.

Figure 1:
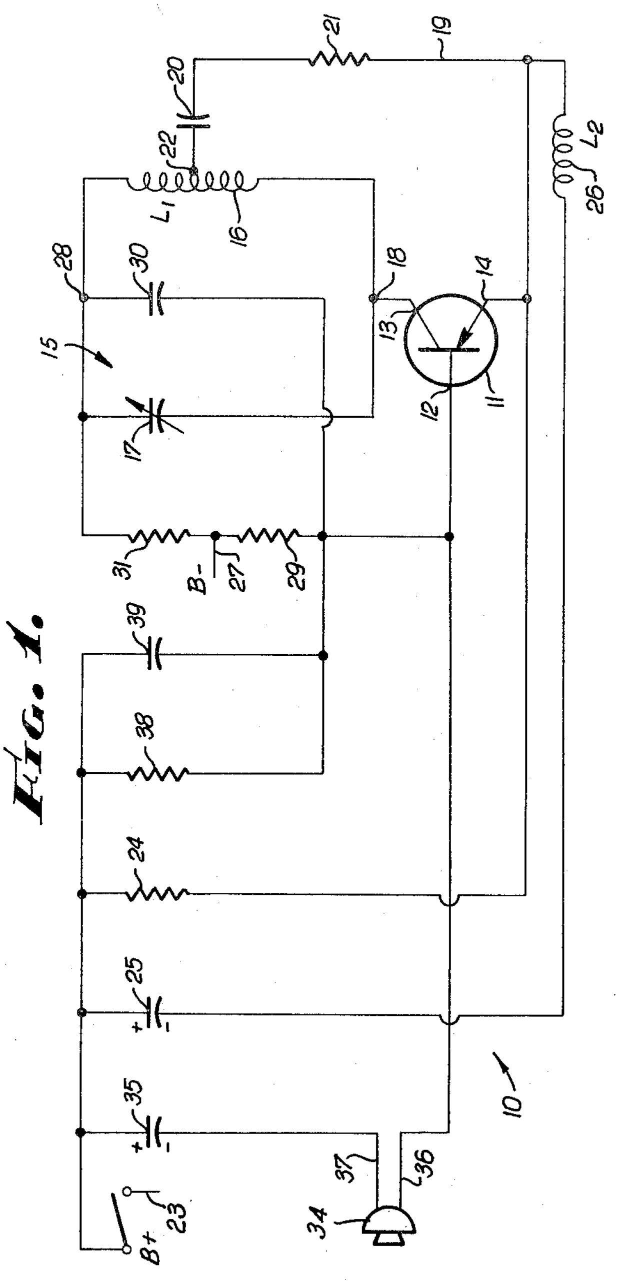
FIGURE 1 is a diagram illustrating the novel transmitter circuit.

In FIGURE 1 the radio frequency oscillator circuit 10 illustrated includes a PNP type transistor 11 having base, collector and emitter terminals at 12, 13 and 14, respectively, although the transistor may be of NPN type with polarity reversal. The tank 15, including coil 16 and variable capacitor 17, is coupled to collector, as for example appears at point 18.

The circuit provides feedback from the tank to the transistor emitter, and typically a feedback loop 19 containing a coupling capacitor 20 and resistance 21 serves this feedback function to control the basic frequency. The loop 19 is shown connected to the coil tap 22 for impedance matching purposes.

Figure 3:
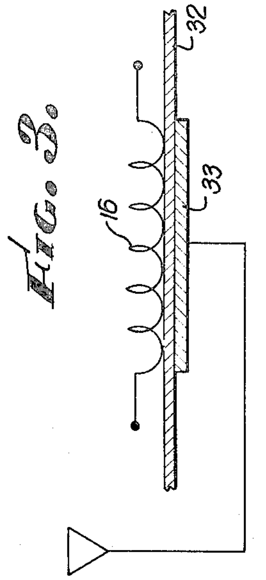
FIGURE 3 shows a method of coupling the tank coil to the antenna.

The circuit also includes a D.C. source, as for example a battery, with a positive terminal electrically connected to the emitter through a current limiting resistor 24, and also through a coupling capacitor 25 and radio frequency control coil 26. The negative terminal 27 of the D.C. source is electrically connected to the tank terminal 28 through parallel branches, one of which includes resistor 29 and capacitor 30 providing RF impedance, and the other of which includes resistor 31 providing D.C. impedance. The tank coil 16 is typically comprised of a few turns of copper wire about an air core, and may be inductively coupled to the antenna as shown in FIGURE 3. As illustrated, the coil 16 is at one side of a mounting board 32, a copper plate 33 being supported at the opposite side of the plate in a plane facing the coil and substantially parallel to the coil axis. The remainder of the antenna is attached to the plate and must have sufficient turns to load the circuit for maximum range desired.

Finally, the transmitter circuit incorporates a microphone 34 to provide amplitude modulation of the oscillator carrier frequency. The microphone may be of ceramic type for producing a variable voltage signal in response to acoustic input, and is connected in series with the battery positive terminal 23, coupling capacitor 35 and base 12 through leads 36 and 37. Terminal 23 is also vonnected with base 12 through bias resistor 38, capacitor 39 being connected across the resistor to shunt current fluctuations which would otherwise develop unwanted voltage bias changes across the resistor.

In the operation of the circuit of FIGURE 1 either the B+ terminal 23 or the B− terminal 27 may be considered as the reference line, while the other is considered as the power supply. Either way, the components in the circuit are electrically connected in the relationship to be described below therebetween. Of course, if an NPN transistor is used in place of the PNP transistor 11, the arrangement of the components of FIGURE 1 would be reversed relative to the B+ terminal 23 and the B− terminal 27.

As one feature of the instant invention, the oscillator of FIGURE 1 is constructed about a single active element (the transistor 11); and it is urged that the accomplishment of both AM and FM modulation with a single transistor circuit is a highly significant achievement. In the accomplishment thereof, the microphone 34 is directly connected to the base 12 or control electrode of the transistor 11. The capacitor 35 which couples the microphone 34 to the B+ power supply 23 serves both to block D.C. currents through the microphone 34 and to introduce audio to the microphone 34. The D.C. operating level of the base 12 of the transistor 11 is set by a voltage division between the B− power supply at 27 and the B+ power supply 23 performed by the resistors 29 and 38. As can be seen from FIGURE 1, the base 12 is connected between the resistor 29 and the resistor 28. The capacitor 39 in parallel with the resistor 38 ensures that high frequency A.C. signals appearing on the base 38 do not effect the operation of the transistor 11; that is to say, the capacitor 39 is a high-frequency by-pass capacitor. It should be noted that due to the effect of the high-pass capacitor 39 all changes of voltage on the base 12 of the transistor 11 will be essentially low frequency. Thus, relative to the high-frequency operation of the oscillator of FIGURE 1 they will constitute only changes in D.C. operating level of the base 12.

The emitter 14 is connected through a resistor 24 to the B+ power supply 23 so that the current passing through the transistor 11 cannot exceed the maximum permitted by the resistor 24. The series capacitor 20 and the resistor 21 connected from the tap 22 to the emitter 14 feed back the carrier frequency signals to the emitter 14; yet due to the presence of the resistor 21 (similar to the effect of the resistor 24) the oscillatory signals and the current running from B+ through the resistor 25, the inductor 26, the resistor 21 and the capacitor 20 to the tap 22 cannot achieve a dangerous or undesired level such that the transistor 11 would cease to switch on and off and would remain only on between cycles of operation. The feedback from the tap 22 to the emitter 14 sets the basic carrier frequency of the oscillator of FIGURE 1, while the changing inductance of the transducer-inductor 26 of the instant invention serves to vary this basic frequency to perform frequency modulation of audio signals in the vicinity of the inductor 26. In one circuit built according to FIGURE 1, the FM sidebands were ±40 kc. The capacitor 25 in series with the inductor 26 performs a D.C. blocking function and introduces audio to the inductor 26 for obtaining frequency modulations of the carrier signal in accordance with the amplitude of the audio signals.

The tank, consisting of the parallel combination of the variable capacitor 17 and the inductance 16 is in effect connected between the collector 18 and the B− power supply 27 through a resistor 21. Variation of the capacitor 17 tunes the tank to the desired carrier frequency of the AM/FM transmitter. The output of the circuit of FIGURE 1 may be taken from the inductor 16; and according to other principles of the invention the signal to be broadcast is coupled from the tank 16 in a unique and advantageous manner which insulates the tanks 16–17 from changes in impedance due to changes in frequency of the carrier signal therein.

AM/FM transmitters built according to the circuit of FIGURE 1 have displayed remarkable performance for the small power used therein. For example, using 22 milliwatts of power, the transmitter of FIGURE 1 was able to broadcast one-half mile, although by the heretofore-accepted power-distance formulae it should not have been able to transmit more than a few feet. Similarly, at 100 milliwatts power the AM/FM transmitter was able to broadcast two and one-half to three miles. It should be noted that the single transistor or other active element in the transmitter circuit of FIGURE 1 acts not only as an FM modulator and carrier signal amplifier but also as audio signal amplifier for the input at the microphone 34. Its performance in this latter role is so exemplary that it is able to pick up any normal-strength voice signals in a 30 square-foot area in its vicinity.

It should be noted that an AM/FM transmitter according to FIGURE 1 is a very inexpensive item. The most inexpensive variety of high-frequency and high-gain transistors can be used in the position 11, while even the cheapest type of microphone in the position 34 can give a 4,000 c.p.s. clarity or fidelity, as far as amplitude modulation is concerned. Since the effect of the invention is that the FM information rides the AM so that transmission ranges of AM magnitude are possible, yet FM fidelity in sound quality are produced at the receiver, in many applications of the instant invention no better microphone need be used. It is estimated that the circuit of FIGURE 1 is capable of miniaturization to the point where it would appear on a card or other base about one inch square.

As stated above, an AM/FM transmitter according to the principles of the instant invention transmits across AM distances a signal that can be frequency-modulated to produce the finer and more distortion-free reproduction characteristics of FM. These results from AM/FM transmission can be verified simply by demodulating both the AM and the FM portions of a signal separately and then switching therebetween at the audio output transducer of the circuit. Such a test will show that there is no atmospheric interference with the AM/FM broadcast (at least at the 100-megacycle range frequencies where the AM/FM transmitter works best), so that the only distortion in the reception would be due to microphone clipping because of overdriving of the microphone 34.

The circuit of FIGURE 1 is extremely flexible in the type of components that it can use and cooperate with. For example, any AM or FM receiver can respond satisfactorily to signals therefrom. Moreover, any type of microphone may be used in the position 34: a carbon microphone, a crystal microphone, a ceramic microphone, a dynamic microphone, or even a vibrating coil of wire similar to the FM transducer shown at 26 and discussed in more detail below. With the best microphones, a fidelity of the amplitude modulation portion of the signal could rise to 16,000 cycles per second.

As stated above, the principle of the superior performance of the circuit of FIGURE 1 is that it is a low-power broadcast transmitter from which the signal is primarily conducted through the earth crust zone, with line-of-sight atmospheric secondary conduction. Thus the circuit of FIGURE 1 includes and proceeds from a principle of radiowave transmission that is new to the instant invention; for applicant has discovered a principle of transmission that constitutes a great improvement over both the formerly-used AM transmission methods and FM transmission methods. This new transmission principle according to the invention consists of broadcasting an AM/FM signal by using a transmitter that produces and broadcasts a radio-frequency carrier signal that is modulated both in its amplitude and in its frequency at the same time and with the same modulating information. The resulting amplitude-modulated and frequency-modulated carrier signals has demonstrated the capabilities described above that far transcent either AM or FM.

Of considerable importance for small-sized transmitter applications is the fact that in actual tests applicant's new AM/FM signal produced by a circuit according to FIGURE 1 has traveled the same or greater distance than standard AM signals and yet has given FM sensitivity and immunity to noise, all on far less power than was heretofore thought possible. Even more important, however, an AM/FM transmitter according to this invention has been operated with substantially undiminished effectiveness by ground transmission. In other words, the circuit of FIGURE 1 is superior even in environments that for all other transmitters are considered grounded and absolutely inpenetrable by signals even from the most powerful transmitters. Therefore, such areas were heretofore impossible to transmit from.

The transmitter of FIGURE 1 has been tested in such well-known examples of such environments as the insides of tunnels, metal-frame buildings, automobiles and trains, where transmission to outside locations was heretofore impossible without the use of an outside antenna. This capability and the immense broadcast distances achieved in trials of transmitters according to the invention shows that AM/FM transmission from circuits according to FIGURE 1 actually propagates through the ground.

Although the exact mechanism of the ground transmission is unknown, apparently it occurs due to varying the floating potentials of the earth itself and imposing the combined AM and FM modulated signals on the earth's electrical-magnetic fields. Whatever the physical phenomena, it is demonstrable that the inventive circuits transmit in a manner that permits AM/FM signals to be sensed by very distant receivers. Moreover, as the transmit is held nearer the ground, signal reception improves.

Generally speaking, the novel transmitter which is set forth in FIGURE 1 and is itself one subject of the invention incorporates a radio-frequency oscillator circuit including the single transistor 11 which may either be tuned through a high-frequency range, as for example 80 to 210 megacycles, or tuned to any frequency desired and crystal controlled to the fixed frequency as shown more clearly in the discussion to follow. In addition to the transmission features set forth above, the important and novel feature of the transmitter itself concerns its performance of both amplitude and frequency modulation with but one transistor or other active element and its auxiliary components.

The result of the principles of the invention as discussed in connection with FIGURE 1 is a new and highly improved radio transmitter especially useful for audio broadcast with hand-held or smaller sets and using low-wattage supplies. The potential cheapness of the FIGURE 1 design has been explained above. As the figures and detailed description show explicitly, the transmitter of the invention needs only the one transistor 11 to the emitter 14 of which a minimal tank circuit 16–17 having inductor 16 and variable capacitor 17 is coupled to form an oscillator circuit. A minimum-priced voice microphone 34 or other and more inexpensive acoustical-to-electrical transducers such as the exposed inductor of the invention may be used to provide the frequency modulation and amplitude modulation of the output signal as taught therein. This is done in the following way: acoustical signals at the microphone or transducer vary the voltage output thereof and thus vary the operating level of one electrode of the active element (in FIGURE 1 of the base 12 of the transistor 11). Since this variation of the operating point of the transistor 11 causes corresponding variation in the amplitude of the A.C. output of the transistor oscillator of FIGURE 1, AM modulation of the oscillator output is accomplished.

An important feature of the applicant's invention lies in the method of FM modulation. The emitter 14 of the oscillator transistor 11 is coupled through the inductor 26 and a coupling capacitor 25 to the positive power supply 23 of the transmitter circuit. When the transistor 11 is in its conductive state, variation of the value of the exposed inductor 26 varies the input impedance to the transistor 11 and the amount of current permitted to pass therethrough into the oscillator tank 16–17. Such a variation of the amount of current in the tank 16–17 shifts the resonant frequency of the tank 16–17 so that the output frequency of the circuit changes to produce frequency modulation in addition to the amplitude modulation resulting from the microphone 34.

It is an important feature of the instant invention that a variable-inductance acoustical-electrical transducer is provided by the construction of the exposed inductor 26 of loose and light-weight wire such that the acoustical signals in the vicinity of the AM/FM transmitter of FIGURE 1 cause the wire to vibrate, thereby varying the instantaneous value of the exposed inductor 26 and frequency-modulating the output of the oscillator tank 16–17. Such a transducer 26 can be manufactured for only a few cents and yet provides an accurate, low-resistance and low-noise "microphone." It has a frequency response to acoustical signals of 40,000 c.p.s., while the most expensive conventional microphones cannot exceed 16,000 c.p.s. In the operation of the transducer 26, microscopic movement of the windings thereof due to ambient acoustical power causes the output inductance of the transducer 26 to vary. In acoustical-electrical transducers according to this principle, the coil may be exposed or mounted in a sound box or the like. Conceivably, of course, the windings could be made to move to vary output inductance under the influence of numerous other parameters, such as force, acceleration, shock, heat change, pressure change, gas or liquid flow, or various electrical and magnetic quantities.

Figure 2:
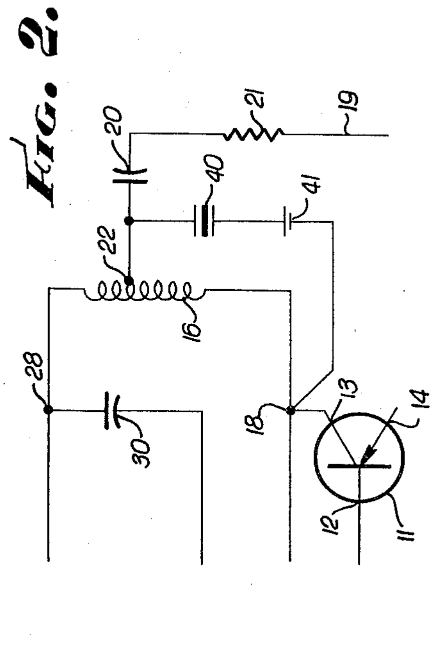
FIGURE 2 is a portion of the FIGURE 1 circuit showing a crystal coupled to the tank.

Referring to FIGURE 2, a portion of the circuit of FIGURE 1 is shown therein for the purpose of illustrating the imposition of crystal control upon the AM/FM transmitter of the instant invention. This crystal control is particularly necessary whenever the power input to the transmitter is sufficiently high to bring it under Federal Communications Commission regulations, since the FCC enforces an extremely high degree of accuracy and stability of output frequency. Although crystal control could be performed with a number of different circuit arrangements, the preferred method according to the instant invention is to couple a crystal 40 between the tap 22 on the inductor 16 and the terminal 18 upon which the signals of the collector 13 appear. A capacitor 41 in series with the crystal 40 ensures that there is no D.C. current component flowing through the crystal. If the tank 16–17 is tuned slightly higher than the resonant frequency of the crystal 40, the circuit of FIGURE 2 will oscillate at the frequency of the crystal. However, variation of the variable capacitor 17 will no longer have the capability of varying the carrier frequency of the transmitter, as long as the tank frequency remains above that of the crystal 40.

Referring to FIGURE 3, the above-mentioned antenna coupling that is new with the instant invention comprises the inductor 16, from which the broadcast signal of the circuit is to be coupled, and an insulating material 32 adjacent thereto. On the other side of the insulating material 32 from the inductor 16 is a metal plate or conductive element 33 which is in the magnetic field of the inductor 16. The broadcast antenna for transmitters according to the instant invention is electrically connected to this metal plate 33.

In the operation of the antenna coupling system of FIGURE 3, variations in the magnetic field of the inductor 16 are coupled through the electrical insulator 32 to set up varying signals on the plate 33 and thus on the entire antenna system of the transmitter. On the other hand, the plate 33 cannot broadcast back to the inductor 16 due to the presence of the insulating material 32, as far as electrical signals are concerned, and due to the inability of the plate 33 to produce significant magnetic signals. Thus the antenna coupling 32–33 is in effect a zero input impedance coupling; that is to say, that variations in the signal or load connected to the conductive plate 33 are incapable of changing the impedance across the terminals of the inductor 16 or of broadcasting or communicating back to the inductor 16 in any way that would affect circuit performance.

It can be seen that the coupling arrangement of FIGURE 3 is a great improvement over the antenna coupling methods practiced heretofore. Most of these couplings included a fixed-series capacitor which in the operation of the circuit would heat and drift, thus promoting inaccuracy of the output signal and consuming more power than is possible with the coupling arrangement of FIGURE 3.

The greatest advantage of the coupling arrangement of FIGURE 3 is that the plate 33 will tune equally well to whatever frequency and signal is magnetically passed through it from the inductor 16. Moreover, since it presents no loading or input impedance to the coupling device (here, the inductor 16), the plate 33 does not have any differential effect upon the circuitry from which it is drawing its signals. This is a great improvement over the prior method of tapping an inductor in order to get the broadcast signal; for the tap would be able to draw current and could overload and badly distort the RF oscillator circuit.

In connection with the antenna discussion of FIGURE 3, the details of the broadcasting performance of the transmitter of the instant invention should be considered. As stated above, the transmitter appears to achieve its vastly increased range/unit of power input partially because of ground transmission. Coupling of the broadcast signal into the ground for ground transmission can be managed with small hand-held sets merely by having the signal radiate into the body of the person holding the set. Thereafter, if the holder of the set is standing on the ground or on structure that is electrically connected to the ground, the ground transmission will occur without use of an antenna. Thus the transmitter according to the instant invention can be operated from inside of cars or steel buildings without coupling the broadcast signal to an outside antenna; and, indeed, the transmission from inside of grounding structures, as discussed above, apparently enhances the strength of the signal rather than totally suppressing it as is the case with conventional transmitters.

Similarly, when the transmitter of the instant invention is hand-held in an airplane, excellent line-of-sight transmission from the aircraft to other aircraft or to ground stations is experienced, even though the broadcast signal from the transmitter is not coupled to the aircraft antenna. It is assumed that the aircraft itself serves as an antenna through a similar "grounding" effect to that discussed above.

Thus, application has achieved a low-power broadcast transmitter from which the signal is primarily conducted through the earth's crust zone, with line-of-sight atmospheric secondary conduction, using a principle of radio-wave transmission that is new to the instant invention and is one of the principles for which protection is claimed. Applicant's method of transmission, which constitutes a great improvement over the formerly used AM transmission methods and FM transmission methods, consists of broadcasting a combined AM and FM signal gotten by modulating a radio-frequency carrier signal *both* in its amplitude and in its frequency at the same time and with the same modulating information. The resulting amplitude and frequency-modulated carrier signal has the capabilities specified above that far transcend either AM or FM in terms of range/unit input power and quality of transmission.

To summarize the proven results: applicant's new AM/FM signal has traveled the same distance as standard AM signals and yet has given FM sensitivity and immunity to noise, all on far less power than was heretofore thought possible. Even more important, however, an AM/FM transmitter according to this invention has been operated with substantially undiminished effectiveness in environments that were considered grounded as to conventional transmitters and therefore were considered impossible to transmit from. Well known examples of such environments are the insides of tunnels, metal-frame buildings, automobiles and trains, where transmission is impossible without the use of an outside antenna. Moreover, the immense broadcast distances achieved in trails of transmitters according to the invention indicates that AM/FM transmission actually propagates through the ground in a manner that permits AM/FM signals to be sensed by very distant receivers.

Generally speaking, the novel transmitter of FIGURE 1 which is the subject of the invention incorporates a radio frequency oscillator circuit including a single transistor oscillator which may either be tuned through a high-frequency range, as for example 80 to 210 megacycles, or (as in FIGURE 2) tuned to any frequency desired and crystal-controlled to the fixed frequency. An important and novel achievement of the transmitter of FIGURE 1 concerns its incorporation of both amplitude and frequency modulation.

This invention provides a new and highly improved radio transmitter especially useful for audio broadcast with hand-held or smaller sets and using low-wattage power supplies. As the figures and detailed description show explicitly for one embodiment, the transmitter of the invention needs only the one transistor 11, to the emitter 14 of which a tank circuit having inductor 16 and capacitor 17 is coupled to form an oscillator circuit. The voice microphone 34 (or any other acoustical-to-electrical transducer) and the exposed inductor 26 combine to provide both frequency modulation and amplitude modulation of the output signal in the following manner: acoustical signals at the microphone 34 vary the voltage output thereof and thus vary the operating level of the base 12 of the transistor 11. Since this variation of the operating point of the transistor 11 causes corresponding variation in the amplitude of the A.C. output of the transistor oscillator, AM modulation of the oscillator output is accomplished.

An important feature of applicant's invention lies in the method of FM modulation: the emitter 14 of the oscillator transistor 11 is coupled through the exposed inductor 26 and a coupling capacitor 25 to the positive power supply 23 of the transmitter circuit. Obviously, when the transistor 11 is in its conductive state, variation of the value of the exposed inductor 26 would vary the input impedance of the transistor and the current permitted to pass therethrough into the oscillator tank 16–17. Such a variation of the amount of current in the tank 16–17 would, of course, shift the resonant frequency of the tank, resulting in frequency modulation in addition to the amplitude modulation resulting from the microphone 34.

Another important feature of the instant invention is the construction of the exposed inductor 26 of loose and light-weight wire such that the acoustical signals in the vicinity of the AM and FM transmitter cause the wire to vibrate, thereby varying the instantaneous value of the exposed inductor and frequency-modulating the output of the oscillator tank 16–17. This variable-inductance transducer has many useful applications beyond that illustrated herein.

Another feature of the invention is the coupling of the antenna of the transmitter to the inductor 16 of the oscillator tank 16–17 only through the conductive plate 33 placed in the field of the tank inductor 16 and electrically insulated therefrom by the insulating board 32 so that antenna load variations cannot affect the performance of than tank 16–17. Other features of the invention include the use of AM and FM modulation in the same transmitter for extremely high fidelity and the use of the crystal 40 in the oscillator tank circuit 16–17 or elsewhere to stabilize the frequency of the AM and FM transceiver as shown in FIGURE 2. This added crystal control aids in preventing FM drift or similar fine inaccuracies, and is important to help in complying with FCC control fineness requirements when the AM and FM transmitter is used at higher power levels.

Although the invention has been described in its preferred form with a certain degree of particularity, it is understood that the present disclosure of the preferred form has been made only by way of example and that numerous changes in the details of construction and the combination and arrangements of parts be resorted to without departing from the spirit and scope of the invention as hereinafter claimed.

I claim as my invention:

1. In combination for transmitting signals representing audio information, first means for providing first signals having amplitudes and first frequencies variable to represent audio information, second means responsive to the first signals for producing an impedance variable in accordance with the amplitude of the first signals, third means for providing carrier signals at a frequency above the frequencies of the first signals, and fourth means responsive to the first and carrier signals for modulating the carrier signals with the first signals and with second signals frequency modulated in accordance with the variations in the variable impedance.

2. The combination set forth in claim 1 wherein the second means includes a coil having at least two turns vibratable in accordance with the amplitudes of the first signals.

3. In combination for transmitting signals representing audio information, first means for providing first signals having amplitude variations in representation of the audio information and having a first particular frequency range, second means responsive to the first signals for providing an impedance variable in accordance with the amplitude variations of the first signals, a current control member having first, second and third electrodes, third means operatively coupled to the first electrode of the current control member for introducing the first signals to the first electrode, fourth means operatively coupled to the second means and the second electrode of the current control member for introducing the variable impedance to the second electrode, and fifth means operatively coupled to the third electrode of the current control member for producing carrier signals at a frequency greater than the frequencies of the first frequency range and modulated by the first signals and for frequency modulating the carrier signals in accordance with the variations in the variable impedance.

4. The combination set forth in claim 3 wherein the second means includes a coil having at least a pair of turns vibratable in accordance with the amplitude variations of the first signals and wherein the fifth means include a resonant circuit whose characteristics are affected by the variable impedance provided by the coil in accordance with the variable spacing of the turns of the coil to produce the frequency modulations.

5. In combination for transmitting signals representing audio information, first means for providing first signals having amplitudes and first frequencies variable to represent the audio information, second means responsive to the first signals for providing an impedance variable in accordance with the variations in the ampliudes of the first signals, and third means including a single current control member operatively coupled to the first and second means for producing carrier signals at a frequency above the first frequencies and for modulating the carrier signals with the first signals and with second signals frequency modulated in accordance with the variations in the variable impedance.

6. The combination set forth in claim 5 wherein the second means includes a coil having at least two turns vibratable in accordance with the amplitudes of the first signals and wherein the coil is connected to the current control member to obtain the frequency modulation of the carrier signals.

7. In a transmitter for an input signal having amplitude modulations, an oscillator circuit including a single transistor having a base, collector and emitter, a tank coil coupled to the collector, the circuit providing feedback from the tank coil to the emitter to produce a carrier frequency modulated in amplitude by the input signal, an antenna capacitively coupled to the tank coil, and a microphone coupled to the base to provide amplitude modulation of the carrier signal in accordance with the amplitude modulations of the input signal, the circuit including a control coil having at least a pair of turns connected to the tank coil and to the microphone and disposed relative to the microphone to vibrate in accordance with the amplitude of the input signal to obtain a frequency modulation of the carrier signal in accordance with the movements of the turns relative to each other.

8. In combination for the modulation and transmission of energy at radio frequencies in accordance with an input signal having amplitude modulations, a power supply, an active element having first, second and third electrodes, the first electrode of the active element being electrically coupled to the power supply and the second electrode of the active element being electrically coupled to the power supply, at least one biasing resistor electrically connected between the first electrode of the active element and the second electrode of the active element, the parallel combination of a first capacitance and a first inductance electrically coupled between the third electrode of the active element and the first electrode of the active element, a first modulation device electrically connected between the power supply and the second electrode of the active element, said first modulation device being constructed to vary the voltage on the second electrode of the active element to produce variations in the amplitude of signals on the third electrode of the active element at the radio frequencies in response to the amplitude modulations of the input signal, and a second modulation device electrically connected between the power supply and the first electrode of the active element, the second modulation device being coupled to the first modulation device and being constructed to vary the frequency of the radio frequency signals on the third electrode of the active element in response to the amplitude modulations of the input signal.

9. The combination set forth in claim 8 wherein the first modulation device is an acoustical-electrical transducer and the second modulation device is a magnetic member disposed relative to the acoustical-electrical transducer to provide a variable reactance in accordance with the amplitude modulations of the input signals for providing variations in the frequencies of the radio frequency signals in accordance with the variations in the reactance.

10. The combination according to claim 9 wherein the second modulation device is an inductor having at least a pair of coils vibratable in accordance with the amplitude modulations of the input signal to vary the reactance of the inductor.

11. In combination for the modulation and transmission of energy at radio frequencies in accordance with an input signal having amplitude modulations, a power supply, a semiconductor having input, control, and output electrodes, the input electrode of the semiconductor being coupled to the power supply and the control electrode of the semiconductor being coupled to the power supply, at least one biasing resistor connected between the input electrode of the semiconductor and the control electrode of the semiconductor, a tuned circuit including a first capacitance and a first inductance coupled between the output electrode of the semiconductor and the control electrode of the semiconductor to produce signals at a particular carrier frequency dependent upon the characteristics of the tuned circuit, electrical insulating means adjacent the first inductance, electrically conductive means adjacent to the electrical insulating means and positioned to be electrically insulated from the first inductance but coupled to the first inductance to receive signals in accordance with the signals produced in the first inductance, an antenna electrically connected to the electrically conductive means, a first modulation device electrically connected between the power supply and the control electrode of the semiconductor device, said first modulation device being responsive to the input signals and being constructed to vary the voltage on the control electrode of the semiconductor device to produce variations in the amplitude of the signals at the carrier frequency in accordance with the amplitude modulations of the input signal, and a second modulation device electrically connected between the power supply and the input electrode of the semiconductor device, the second modulation device being coupled to the first modulation device to vary the frequency of the signals at the carrier frequency in accordance with the amplitude modulations of the input signal.

12. The combination according to claim 11 wherein the first modulation device is a microphone and the second modulation device is a variable inductance disposed relative to the microphone to provide variations in inductance in accordance with the amplitude modulations of the input signal.

13. The combination according to claim 12 wherein the variable inductance is an inductor having at least a pair of turns vibratable in accordance with the amplitude modulations of the input signal.

References Cited by the Examiner

UNITED STATES PATENTS

| | | | |
|---|---|---|---|
| 3,049,711 | 8/1962 | Hooper | 343—895 X |
| 3,108,234 | 10/1963 | Burns. | |

OTHER REFERENCES

Chernof, Radio & Television News, October 1956, pp. 58, 59.

DAVID G. REDINBAUGH, *Primary Examiner.*

JOHN W. CALDWELL, *Examiner.*

UNITED STATES PATENT OFFICE
CERTIFICATE OF CORRECTION

Patent No. 3,311,830 March 28, 1967

Clifford D. Skirvin

It is hereby certified that error appears in the above numbered patent requiring correction and that the said Letters Patent should read as corrected below.

In the heading to the printed specification, lines 3 and 4, for "assignor to Microdat Inc.," read -- assignor to Microdot Inc., --.

Signed and sealed this 14th day of November 1967.

(SEAL)
Attest:

Edward M. Fletcher, Jr.
Attesting Officer

EDWARD J. BRENNER
Commissioner of Patents